June 2, 1959 C. R. YOUNKIN 2,888,847
TOOL FOR STRAIGHTENING MUFFLER OUTLETS
Filed July 18, 1956
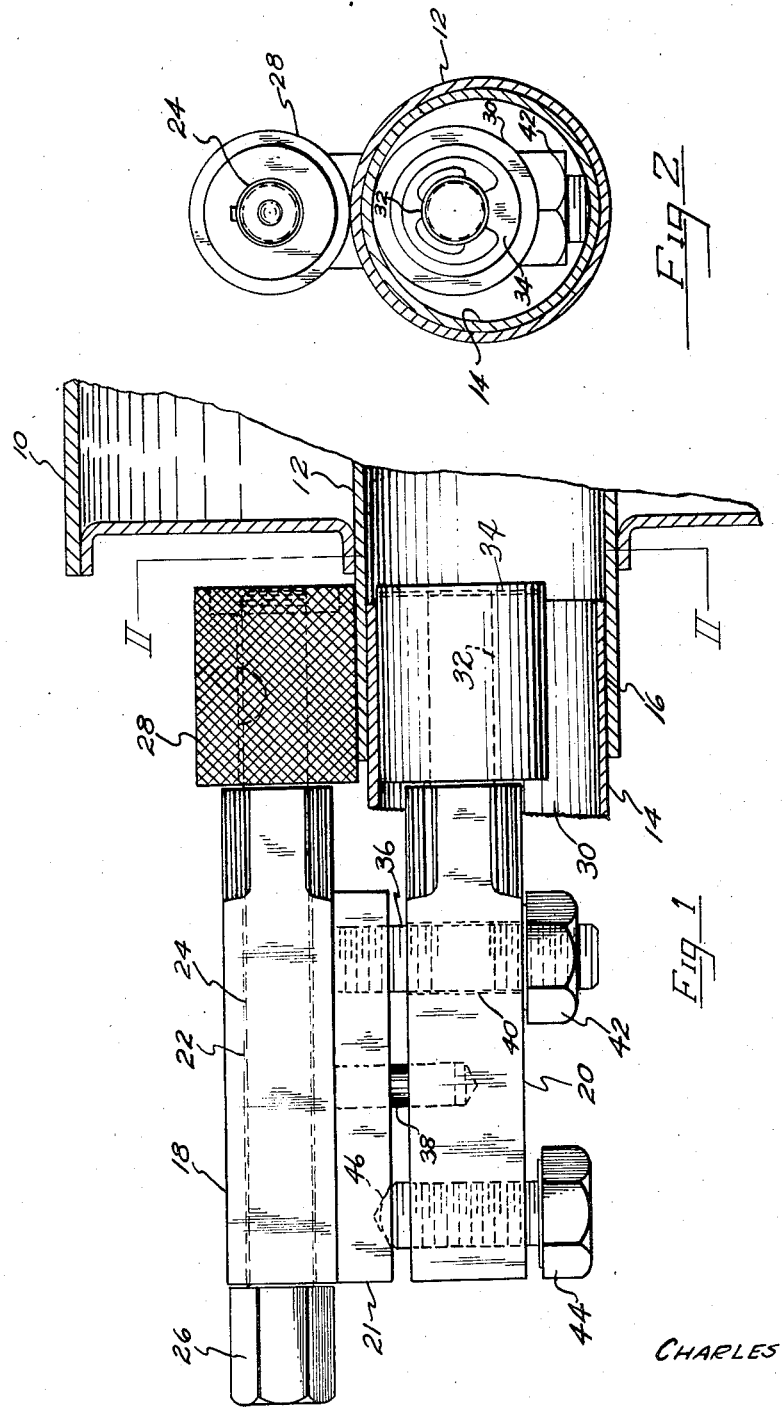
INVENTOR
CHARLES R. YOUNKIN
BY
ATTORNEY

United States Patent Office 2,888,847
Patented June 2, 1959

2,888,847

TOOL FOR STRAIGHTENING MUFFLER OUTLETS

Charles R. Younkin, Jackson, Mich.

Application July 18, 1956, Serial No. 598,700

2 Claims. (Cl. 81—3)

The invention relates to small hand tools for facilitating disassembly of automobile muffler and tailpipe components.

Because of the low clearances, high temperatures and exposure to water that an automobile exhaust muffler and tailpipe are subjected to, the rate of corrosion and damage necessitate the replacement of these parts several times during the life of an automobile. After extensive use, the tailpipe and muffler, which were originally assembled by inserting the tailpipe into the muffler and beading together, became so corroded that it is usually impossible to remove the tailpipe without damaging the muffler and consequently a good muffler may be ruined attempting to remove a worn tailpipe.

It is an object of the invention to design a small hand tool which will easily remove the beading affixing automotive tailpipes and mufflers permitting the disassembly without damage to the muffler.

It is a further object of the invention to produce a muffler disassembling hand tool which is economically manufactured and adjustable so as to be adapted to a wide variety of muffler and tailpipe sizes.

These and other objects of the invention will become apparent when viewed in regard to the specification and accompanying drawings wherein:

Fig. 1 is an elevational view of the invention when in use on a muffler and tailpipe, and Fig. 2 is a cross-section of the invention taken along the line II—II of Fig. 1.

The invention may be utilized in any operation of removing a tailpipe and muffler which are beaded together, however, the design is compact enough to allow the tailpipe to be removed while the muffler is in situ underneath the automobile as disclosed in Fig. 1.

In Fig. 1 the muffler 10 is held in location beneath the automobile by conventional means, the muffler outlet pipe being shown at 12. The damaged or worn tailpipe 14, which is to be replaced, is sawed off adjacent the joint 16 where the tailpipe 14 and muffler outlet 12 are fitted together. An indented bead, not shown, is usually rolled into the outlet 12 and tailpipe 14 at the factory forming a tight connection at the joint 16.

The tool consists of a pair of body members 18 and 20 which are of a substantially square cross section, a spacer plate 21 is welded or otherwise fixed to body 18 for purposes later described. Body member 18 is also provided with an axial bore 22 in which a shaft 24 is rotatably journaled. The shaft 24 is formed with a wrench engaging portion 26 at one end and a knurled roller 28 is keyed at the other end thereof.

A second roller 30 is rotatably mounted on a shaft 32 which is fixed in the body member 20. Roller 30 will, therefore, be in close spaced proximity to the roller 28 and is held on the shaft 32 by a snap ring 34.

A threaded stud 36 projects from the spacer plate 21 as does a guide pin 38. The stud 36 extends through a bore 40 within body 20 and is provided with a nut 42 whereby body 20 may be affixed to the body 18, the pin 38 also cooperates with a bore in body 20 insuring parallel relationship between members 18 and 20 at all times. An adjusting screw 44 threads in body 20 and engages a recess 46 in plate 21 to complete the adjusting means.

The operation of the tool is as follows:

The tailpipe 14 may be sawed off adjacent the muffler 10 as shown in Fig. 1 and the tool is placed as shown, the roller 28 contacts the outlet pipe 12 while the roller 30 engages the inside of the tailpipe 14. The nut 42 and screw 44 are adjusted whereby the body members 18 and 20 are substantially parallel and the nut 42 is tightened sufficiently to "squeeze" the tailpipe 14 and muffler outlet pipe 16 between the rollers 28 and 30.

A wrench or other suitable manually operated handle is connected to the portion 26 and rotated thereby rotating the roller 28. The knurled surface of the roller 28 will bite into the outlet pipe 12 and cause the entire tool to rotate about the outlet pipe 12 and tailpipe 14. As the rollers 28 and 30 move about the pipes circumference the beading holding pipes 12 and 14 together will be "ironed" out and the working of the metal will break loose corrosion and rust.

The nut 42 may be progressively tightened and the tool revolved about the pipes until the beading and corrosion have been removed sufficiently to permit the tailpipe 14 to be removed from the outlet pipe 12. Th outlet pipe 12 is not damaged in any manner and a new tailpipe may be inserted and clamped in engagement with outlet 12.

The adjusting means 42 and 44 permit the tool to be adapted to a wide range of muffler sizes and the tool may be separated by ordinary tools present in all garages and service stations.

It is thus seen that the invention discloses a tool which readily permits tailpipes and mufflers to be disassembled without damaging the muffler. The invention may be economically manufactured and is of such construction as to be easily operated by the average mechanic without prior instruction.

It will be understood that modifications to the disclosed embodiment may be apparent to one skilled in the art without departing from the spirit and scope of the invention and it is intended the invention be confined only by the scope of the following claims.

I claim:

1. A muffler disassembly tool comprising a first body member, a spacer plate fixed to said first body member, a threaded stud and pin projecting from said spacer plate, a second body member, a pair of bores in said second body member cooperating with said stud and pin whereby said first and second body members may be adjustably positioned in spaced relation, an adjusting screw threaded into said second body member and bearing on said spacer plate, a knurled drive roller rotatably journaled in said first body member, a wrench engaging surface drivingly connected to said drive roller, and a second roller journaled to said second body member in opposing relation to said drive roller whereby a muffler and tailpipe placed between said rollers may be worked permitting disassembly of said muffler and tailpipe.

2. A vehicle muffler disassembly tool for rolling out the tail piece from the muffler comprising a pair of elongated body members, rollers located at the outer ends of said members in opposed relation to each other to enable one roller to be inserted within the tail piece adjacent the muffler, the other roller to engage the outside of the muffler connection, a rotatable shaft supported in one of said members for rotation and having one of said rollers keyed to one end thereof and having a wrench engaged head at the opposite end for rotating said shaft, means for progressively adjusting said rollers toward each other during the rotation of said shaft to roll out the tail piece including a threaded stud carried by said one of said body members having said shaft and extending transversely through a transverse opening defined in said other body member and having an adjustable nut to vary the spacing between said body members and to adjust said rollers toward each other, said stud being located adjacent the end of said body members carrying said rollers, and an adjustable abutment threaded in said other body member adjacent the other ends of said body members and reacting against said first body member to control the movement of said rollers toward and from each other.

References Cited in the file of this patent

UNITED STATES PATENTS

| | | |
|---|---|---|
| 909,182 | Hart | Jan. 12, 1909 |
| 1,802,232 | Bridwell | Apr. 21, 1931 |